United States Patent
Komatsu et al.

(10) Patent No.: US 7,249,759 B2
(45) Date of Patent: Jul. 31, 2007

(54) SHEET FEEDING APPARATUS

(75) Inventors: Shunichi Komatsu, Chiba (JP); Kunio Tsuruno, Tokyo (JP); Yuzo Matsumoto, Ibaraki (JP); Yasuo Fukatsu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 10/923,741

(22) Filed: Aug. 24, 2004

(65) Prior Publication Data
US 2005/0063023 A1 Mar. 24, 2005

(30) Foreign Application Priority Data
Sep. 1, 2003 (JP) ............... 2003-308783

(51) Int. Cl.
*B03G 15/00* (2006.01)
(52) U.S. Cl. .......................... 271/97; 399/390
(58) Field of Classification Search ........... 271/97, 271/105, 3.15; 399/393, 391, 390
See application file for complete search history.

(56) References Cited

U.S. PATENT DOCUMENTS

| | | | |
|---|---|---|---|
| 5,476,041 A * | 12/1995 | Czotscher | 101/232 |
| 5,535,012 A | 7/1996 | Matsumoto et al. | 358/400 |
| 5,580,045 A | 12/1996 | Matsumoto et al. | 271/298 |
| 5,645,274 A * | 7/1997 | Ubayashi et al. | 271/94 |
| 6,021,305 A | 2/2000 | Sato et al. | 399/374 |
| 6,131,898 A | 10/2000 | Hiroi et al. | 271/10.03 |
| 6,203,003 B1 | 3/2001 | Sato et al. | 271/3.01 |
| 6,246,491 B1 | 6/2001 | Matsumoto et al. | 358/468 |
| 6,471,429 B1 | 10/2002 | Isobe et al. | 400/582 |
| 6,493,113 B1 | 12/2002 | Fujii et al. | 358/488 |
| 6,804,474 B2 | 10/2004 | Morita et al. | 399/23 |
| 6,942,208 B2 * | 9/2005 | Okazaki et al. | 271/97 |
| 7,016,641 B2 * | 3/2006 | Matsumoto et al. | 399/390 |
| 2003/0044186 A1 | 3/2003 | Kato et al. | 399/16 |
| 2004/0022564 A1 | 2/2004 | Fujii et al. | 399/382 |

FOREIGN PATENT DOCUMENTS

JP 2001-48366 2/2001

* cited by examiner

*Primary Examiner*—Patrick Mackey
*Assistant Examiner*—Kaitlin Joerger
(74) *Attorney, Agent, or Firm*—Fitzpatrick, Cella, Harper & Scinto

(57) ABSTRACT

A sheet feeding apparatus including a stacking portion for stacking a plurality of sheets thereon, a sheet feeding portion for feeding the sheets stacked on the stacking portion, a fan for sending air to the sheets to loosen the sheets stacked on the stacking portion, a heater for warming the air sent by the fan, a temperature detecting portion for detecting the temperature of the heater, and a control portion for starting the driving of the fan in conformity with the temperature detecting portion having detected a predetermined temperature after temperature control for adjusting the heater to a target temperature has been started.

8 Claims, 6 Drawing Sheets

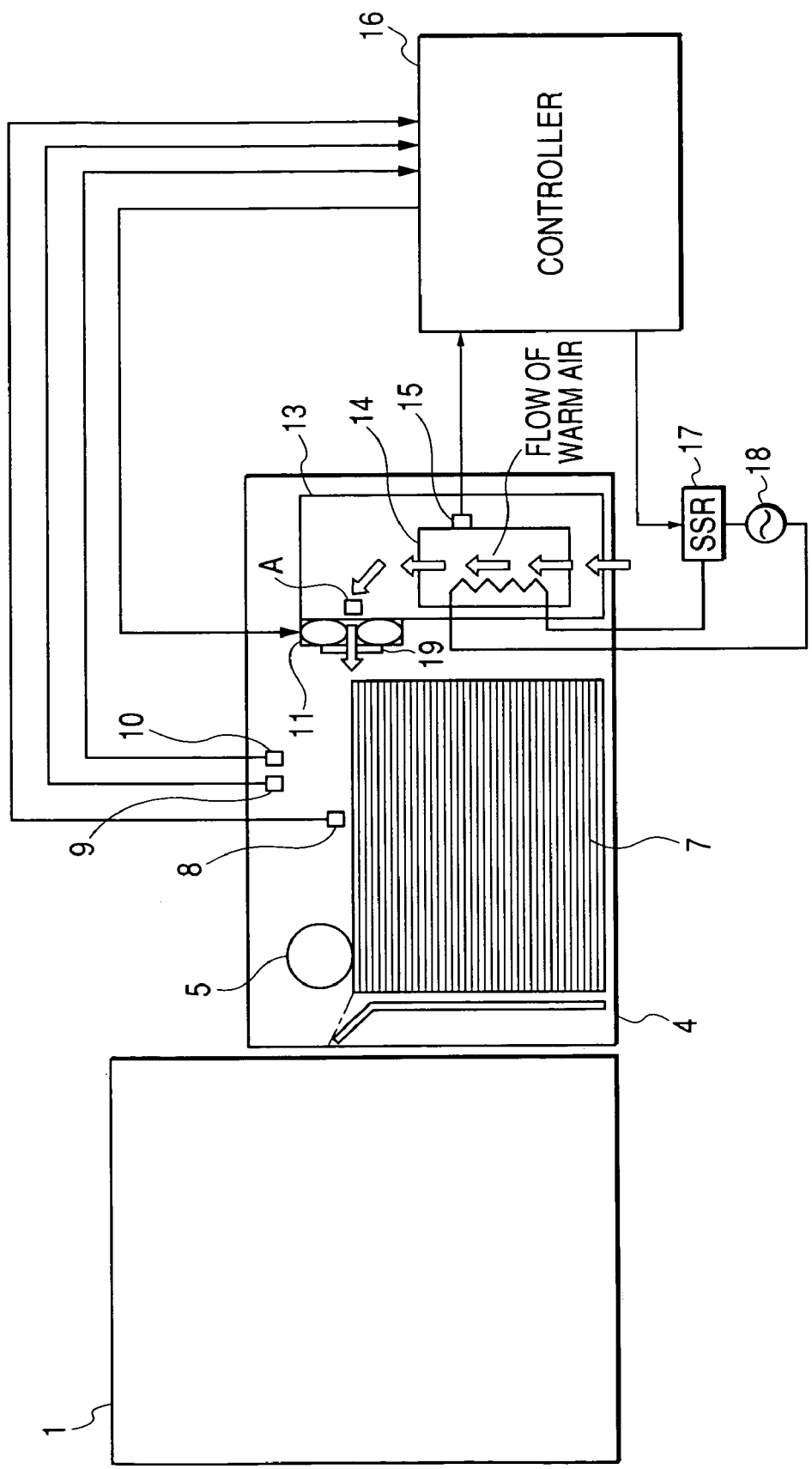

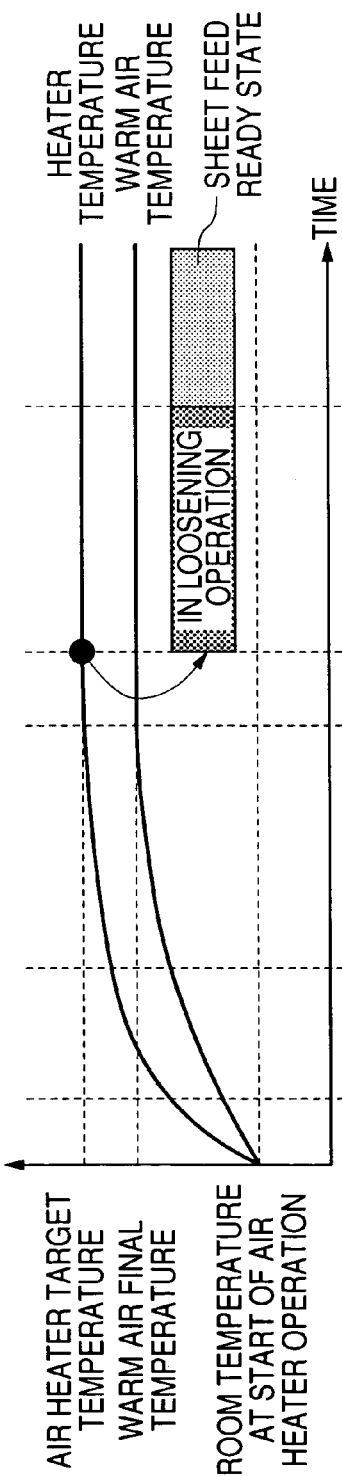
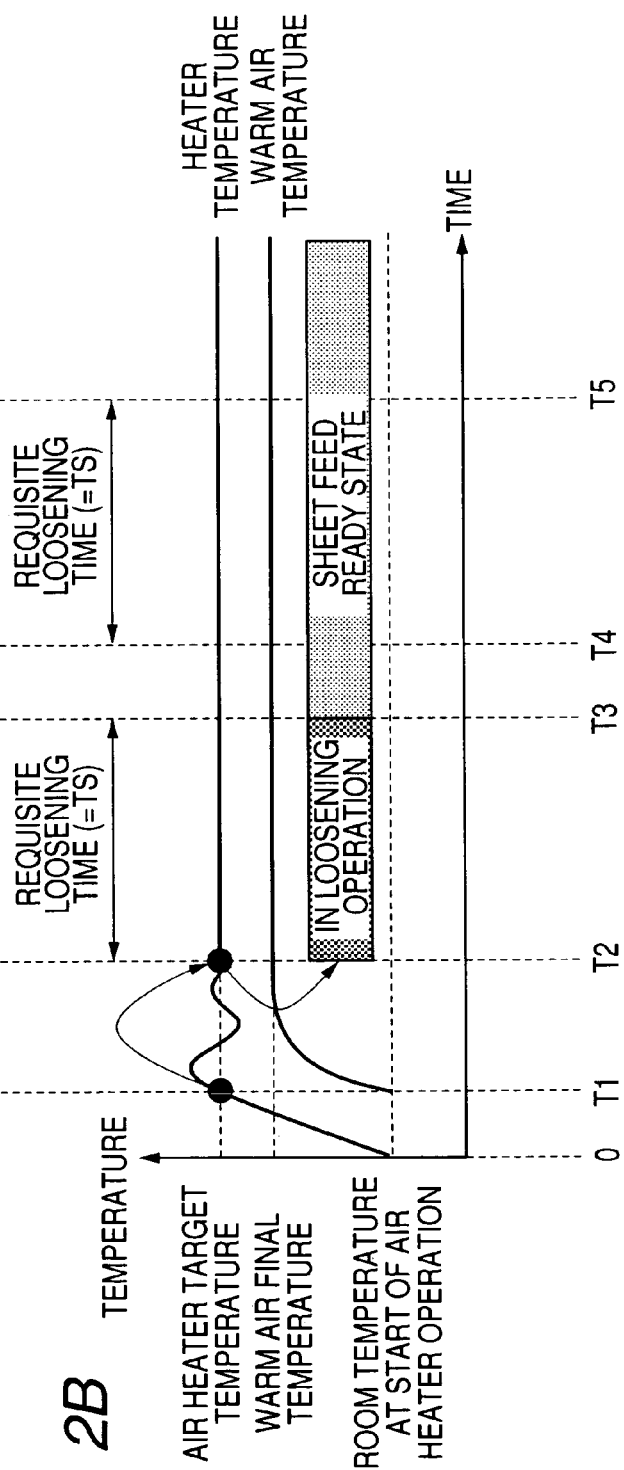
FIG. 2A
FIG. 2B

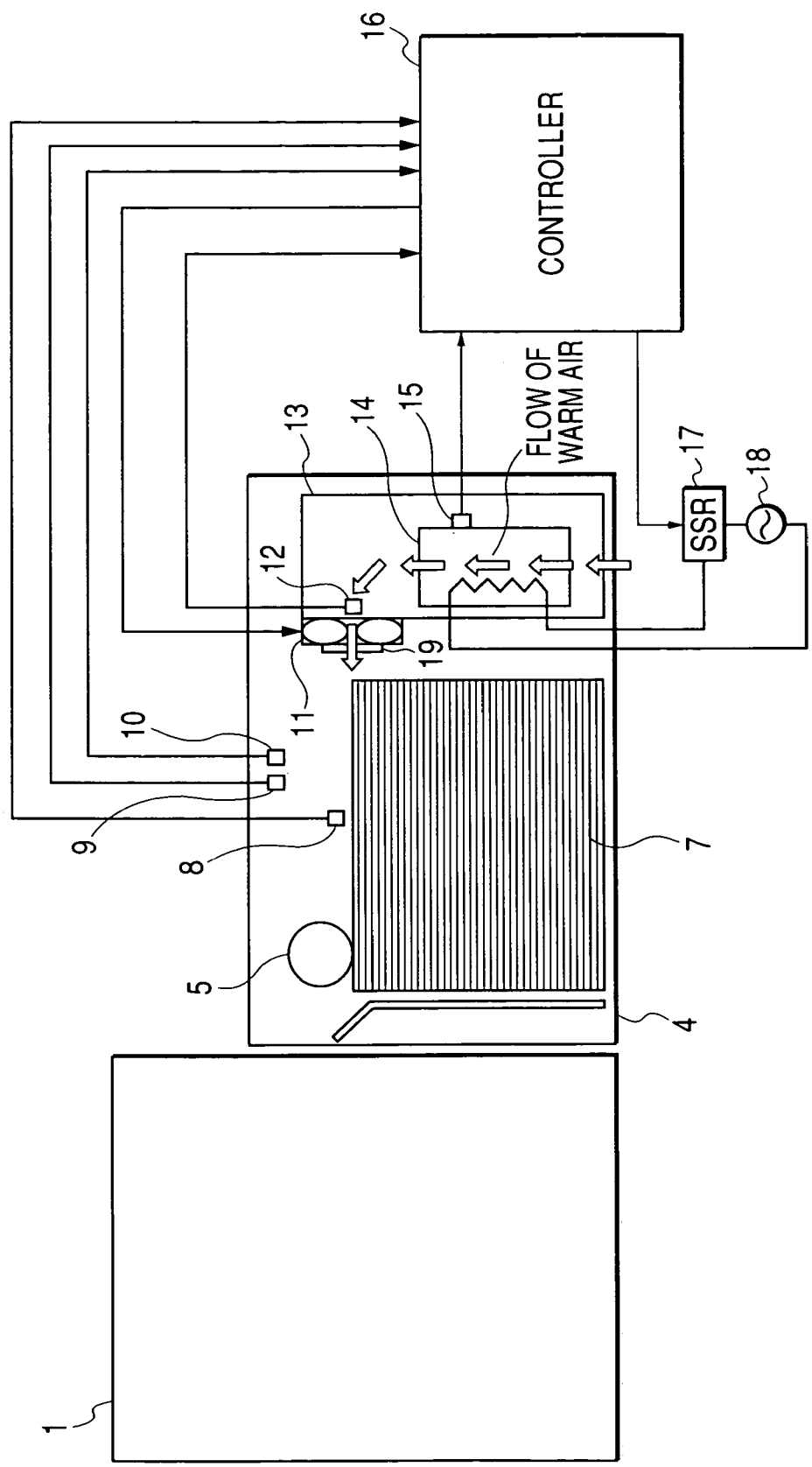

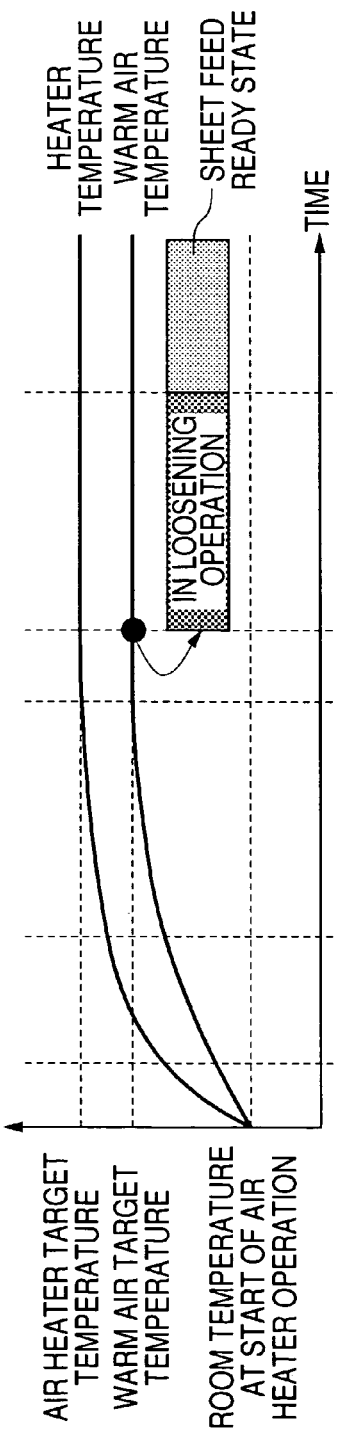
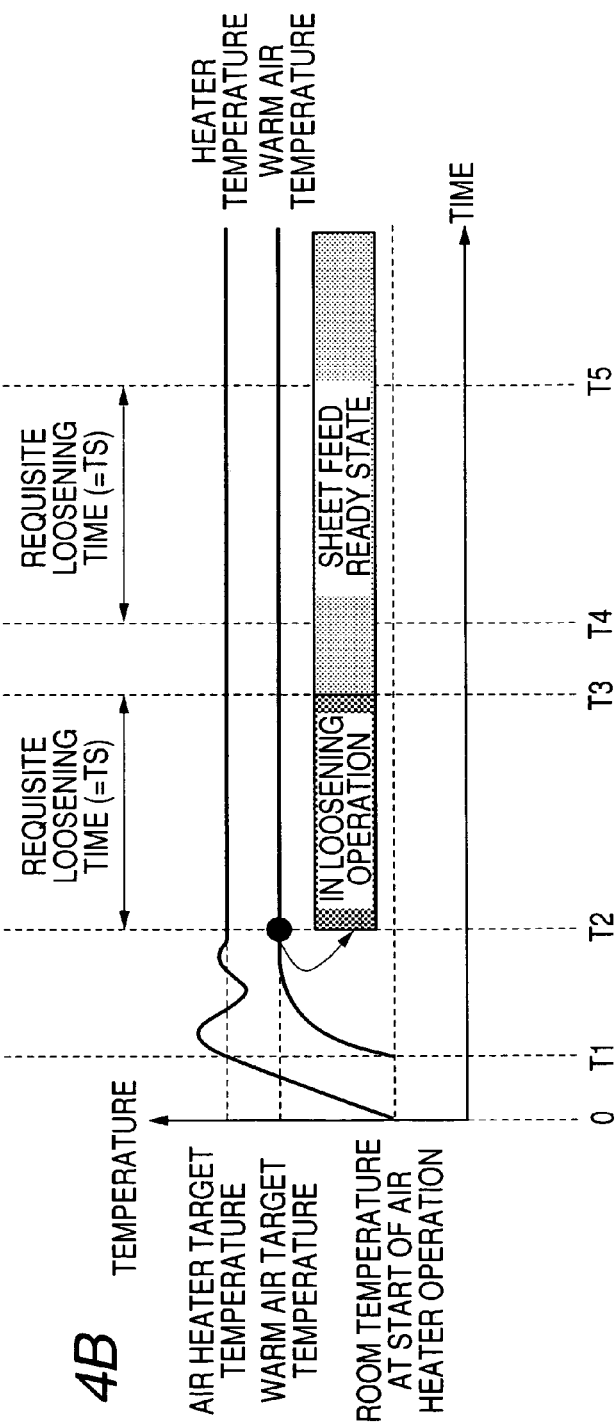

SHEET FEEDING APPARATUS

BACKGROUND OF THE INVENTION

1. Field of the Invention

The invention relates to a sheet feeding apparatus for sending warm air to a sheet to be fed.

2. Related Background Art

There has been proposed a construction for flowing warm air against paper in a sheet feeding paper deck mounted on an image forming apparatus such as a copying machine to thereby loosen the paper (for example, Japanese Patent Application Laid-Open No. 2001-048366).

In this example of the prior art, basically the temperature controlling operation of an air heater and a sheet loosening operation (for example, the start of fan rotation and the start of swing shutter motor rotation) are started at a time. That is, the fan starts rotation simultaneously with the start of the temperature control of the air heater.

Therefore, much time is required until the air heater temperature, i.e., warm air temperature assumes a predetermined value, and this leads to the disadvantage that the time until the loosening operation is terminated and the sheet feeding operation becomes possible is slow with a result that the performance of the entire apparatus is lowered.

Also, in order to avoid the above-noted disadvantage peculiar to the above-described example of the prior art, there is conceivable a construction for starting the loosening operation before the air heater temperature reaches the predetermined value, but in this case, the loosening operation (air assisting operation) is started before the warm air temperature rises sufficiently, and this leads to the disadvantage that loosening becomes insufficient.

Generally, in an air assisting construction wherein warm air is blown against the sheets in the paper deck to thereby loosen the sheets to reliably loosen the sheets, it is necessary to flow warm air of a predetermined temperature or higher for a predetermined value of time or longer, and flowing air of a temperature lower than the predetermined temperature is little effective for the loosening of the paper. Also, in case of blowing an air of low temperature against the sheets of paper, the sheets of paper may get damp. As a result, this may affect the loosening operation, and deteriorate quality of images to be formed on the sheets of paper.

SUMMARY OF THE INVENTION

It is an object of the present invention to provide a sheet feeding apparatus which has eliminated the above-noted inconveniences and a controlling method therefor.

It is another object of the present invention to provide a sheet feeding apparatus which can quickly and reliably effect the loosening of sheets and can accurately convey the sheets and a controlling method therefor.

Other objects of the present invention will become apparent from the following description based on the accompanying drawings and the appended claims.

BRIEF DESCRIPTION OF THE DRAWINGS

FIG. 1 shows a paper deck according to a first embodiment of the present invention.

FIG. 2A shows heater temperature and warm air temperature in a case not according to the first embodiment.

FIG. 2B shows heater temperature and warm air temperature in a case according to the first embodiment.

FIG. 3 shows a paper deck according to a second embodiment of the present invention.

FIG. 4A shows heater temperature and warm air temperature in a case not according to the second embodiment.

FIG. 4B shows heater temperature and warm air temperature in a case according to the second embodiment.

DESCRIPTION OF THE PREFERRED EMBODIMENTS

First Embodiment

Figure 5B:
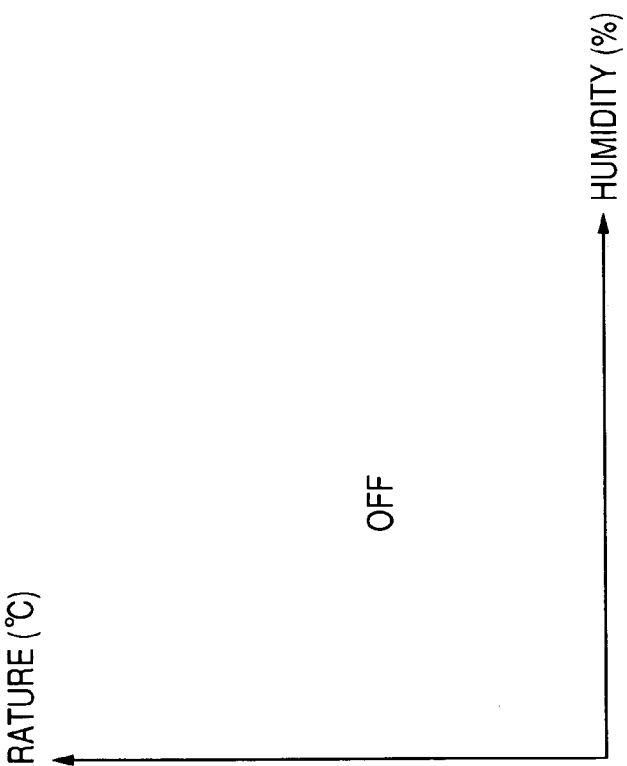
FIG. 5B shows a chart for determining the target temperature of the air heater 14 in the case of non-coat paper.

In FIG. 1, an image forming apparatus 1 effects image forming on a sheet 7 supplied from a paper deck 4. A pickup roller 5 is rotated to thereby feed the uppermost one of a plurality of sheets 7 stacked on the paper deck 4 toward the image forming apparatus 1.

A sheet detecting sensor 8 detects the thickness, density (basis weight) and size of the sheet 7 and sends information to a controller 16. Besides the detection by the sheet detecting sensor 8, a user can also input information regarding the sheet from the operating portion or the like of the image forming apparatus 1.

A temperature detecting sensor 9 and a humidity detecting sensor 10 detect the temperature and humidity of the interior of the paper deck 4, and send this information to the controller 16.

A fan 11 blows warm air against the vicinity of the uppermost one of the stacked sheets and loosens the sheet 7 to thereby prevent the double feeding of the sheets. A swing shutter 19 is reciprocally moved, for example, in a vertical direction, and partly intercepts or passes the warm air from the fan 11 to thereby loosen the sheet 7. The swing shutter 19 is driven by a swing motor (not shown).

A duct 13 has an air heater 14 therein. In this embodiment, air is taken in from the lower portion of the duct 13, and the air warmed by the air heater 14 is exhausted by the fan 11.

An AC voltage 18 is supplied to the air heater 14 by the controller 16 through the ON/OFF control of a solid state relay (SSR) 17, and for example, a resistor included in the air heater 14 generates heat to thereby warm the air taken in from the lower portion of the duct 13.

An air heater temperature detecting sensor 15 is in contact with the air heater 14 and sends information regarding the temperature of the air heater 14 to the controller 16. The controller 16 effects temperature control through the AC voltage 18 and the ON/OFF control of the SSR 17 on the basis of the information from the air heater temperature detecting sensor 15 so that the temperature of the air heater 14 may assume a predetermined value.

Figure 6:
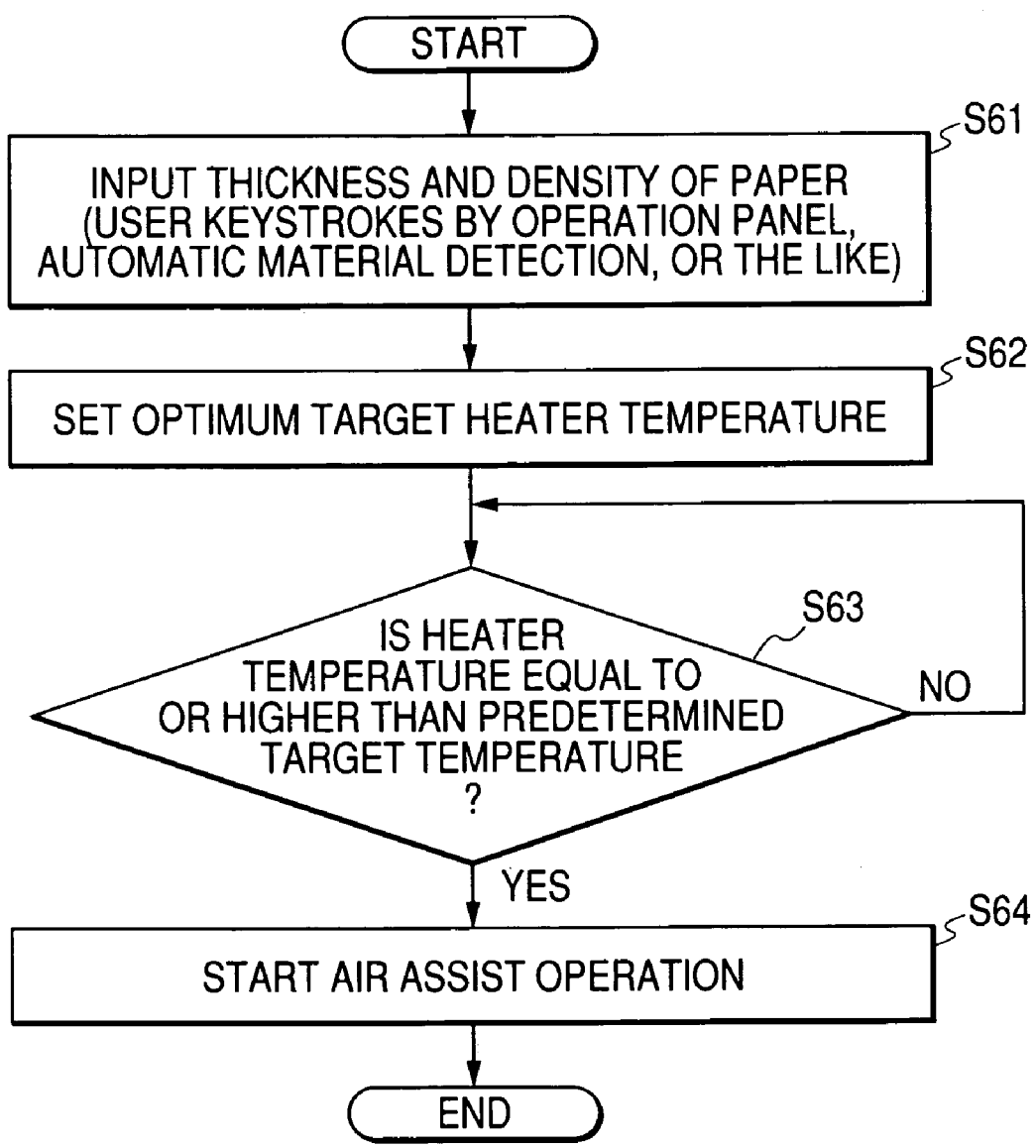
FIG. 6 is a control flow chart of a controller 16.

Description will hereinafter be made of the operation until in the above-described construction, the air heater 14 starts temperature control to thereby loosen the sheets 7 and the pickup roller 5 starts sheet feeding. FIG. 6 shows a control flow chart of the controller 16.

Figure 5A:
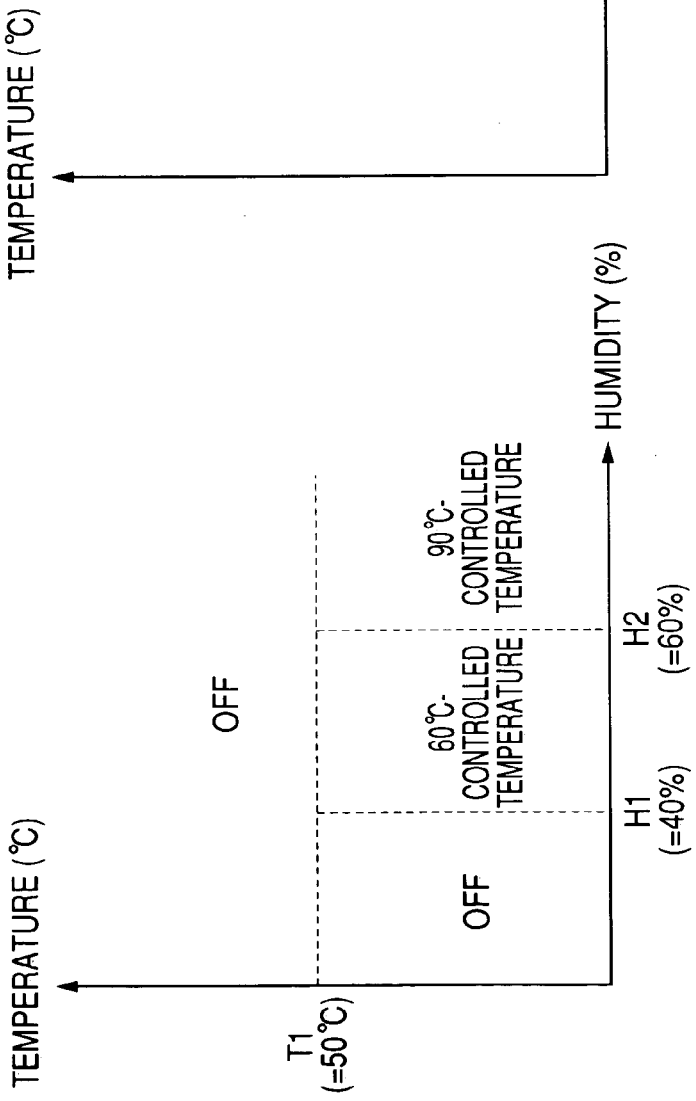
FIG. 5A shows a chart for determining the target temperature of an air heater 14 in the case of coat paper.

First, information regarding the kind, thickness, density and size of the sheet is obtained from the sheet detecting sensor 8 or the operating portion (step S61). An optimum target air heater temperature is determined on the basis of the temperature information and humidity information sent form the temperature detecting sensor 9 and the humidity detecting sensor 10, respectively, to the controller 16, and the information regarding the kind, thickness, density and size of the sheet sent from the sheet detecting sensor 8 or the operating portion to the controller 16. The controller 16 determines the target air heater temperature on the basis of a program for executing a judgment flow corresponding to charts shown in FIGS. 5A and 5B (step S62).

For example, let it be assumed that the sheet detecting sensor 8 has detected that the kind of the sheet is coat paper, the temperature detecting sensor 9 has detected 25° C. and the humidity detecting sensor 10 has indicated 70%. In that case, the controller 16 determines the optimum target air heater temperature to be 90° C.

In a case where the controller 16 temperature-controls the air heater 14, when the information from the air heater temperature detecting sensor 15 indicates a temperature less than 90° C., the SSR 17 is switched on to thereby electrically energize the air heater 14 and raises the temperature of the air heater, and when the aforementioned information indicates 90° C. or higher, the SSR 17 is switched off and the air heater 14 is not electrically energized.

In the case of non-coat paper, the heater is always turned off.

The subsequent operation will be described with reference to FIGS. 2A and 2B. FIG. 2B shows the operation of the present embodiment. The axis of abscissas indicates time, and the axis of ordinates indicates temperature, and the graph shows the temperature of the air heater 14 (the output of the air heater temperature detecting sensor 15) and the warm air temperature. The arrows in FIGS. 2A and 2B indicate a trigger relation.

The warm air temperature is the temperature of the air at a point A in FIG. 1. Although in present embodiment, the temperature detecting sensor is not provided at the point A, there is shown the state of the warm air temperature at the point A when the temperature of the air heater 14 is such a curve as shown in FIG. 2B.

First, the controller 16 starts the temperature control of the air heater 14 at the timing of T=0. At this point of time, the fan 11 is not rotated, nor the swing shutter 19 is operated.

Thereby, the temperature of the air heater 14 rises and reaches an air heater target temperature at timing T1.

In FIG. 6, whether the temperature of the air heater has reached the target temperature is judged (step S63), and when it reaches the target temperature, the controller 16 starts the rotation of the fan 11 (step S64). At this point of time, however, the swing shutter 19 is not operated.

Thereby, the warm air temperature rises and reaches a warm air final temperature at timing T2. Here, for the first time, the controller 16 operates the swing shutter 19, and the air of the warm air final temperature is flown against the vicinity of the uppermost one of the sheets 7 whereby the sheets are loosened. During the time between T1 and T2, the heater temperature overshoots undershoots, but actually the time from T1 till T2 is short and therefore, there is little or no influence upon the warm air temperature.

Accordingly, the sheet loosening operation is started from the timing T2. The warm air temperature at this time has reached the warm air final temperature and the warm air has become warm air of a predetermined temperature from the beginning of the loosening operation.

The time necessary for loosening when this warm air of the predetermined temperature is flown is TS. That is, the loosening operation is completed at timing T3 whereat the time TS has elapsed from the timing T2, and it is possible to start the sheet feeding operation (to rotate the pickup roller 5) from the timing T3.

In air assist wherein warm air as flown against the sheets in the paper deck to thereby loosen the sheets, to loosen the sheets reliably, it is necessary to flow warm air of a predetermined temperature or higher for the predetermined time TS or longer, and flowing air of a temperature lower than the predetermined temperature is little effective for the loosening of the sheets.

Here, the state when unlike the present embodiment, the rotation of the fan 11 has been started with the start of the temperature control of the air heater 14 will be described with reference to FIG. 2A. At the timing of T=0, the temperature control of the air heater 14 is started and simultaneously therewith, the rotation of the fan 11 is started. It is to be understood that at this time, the swing shutter 19 is not operated.

Thereupon, the air of a low temperature from the lower portion of the duct 13 introduced by the rotation of the fan 11 hampers the temperature rise of the air heater 14 and therefore, the rising speeds of the heater temperature and warm air temperature are lower than in the present embodiment (FIG. 2B), and it is after timing T4 later than T2 that the heater temperature reaches the air heater target temperature.

Then, the swing shutter 19 is operated from the timing T4 and barely the original loosening operation becomes possible and therefore, it is at timing T5 whereat a time TS has elapsed from the timing T4 that the loosening operation is completed. For the first time at the timing T5, the sheet feeding operation becomes possible and therefore, as compared with the present embodiment, the time when sheet feeding becomes possible is late, and an improvement in the productivity of the entire apparatus cannot be expected.

Also, there is conceivable a method of starting the loosening operation before the heater temperature reaches a target temperature, i.e., a method of operating the swing shutter 19 from T=0 (or somewhere between T=0 to T=4, instead of operating the swing shutter 19 from the timing T4, but in this method, the loosening operation is started before the warm air temperature rises sufficiently and therefore, loosening becomes insufficient.

As previously described, generally, in the air assist wherein warm air is blown against the sheets in the paper deck to thereby loosen the sheets, to loosen the sheets reliably, it is necessary to flow warm air of the predetermined temperature or higher for the predetermined time TS, and flowing air of a temperature lower than the predetermined temperature is little effective for the loosening of the sheets. Also, in case of blowing an air of low temperature against the sheets of paper, the sheets of paper may get damp. As a result, this may affect the loosening operation, and deteriorate quality of images to be formed on the sheets of paper.

Accordingly, by controlling as in the present embodiment as previously described, it becomes possible to effect reliable loosening of the sheets within the shortest time.

That is, the air assisting operation (the rotation of the fan and the rotation of the swing shutter motor) is started, after the air heater has assumed a predetermined temperature or higher, or after a predetermined time has elapsed after the air heater has assumed the predetermined temperature or higher and therefore, warm air of a predetermined temperature can be made more quickly, and the loosening operation can be terminated earlier to thereby bring about a state in which sheet feeding is possible.

Second Embodiment

A second embodiment is shown in FIG. 3. Chiefly the differences of this embodiment from the first embodiment will hereinafter be described. In the second embodiment, a warm air temperature detecting sensor 12 is provided at the point A of FIG. 1 in the first embodiment. The warm air temperature detecting sensor 12 sends information regarding the temperature of the warm air to the controller 16. While in the first embodiment, the timing for the start of the loosening operation has been effected by the detection of the heater temperature, in the second embodiment, it is effected by a value from the warm air temperature detecting sensor 12.

The time description of the above-described operation is shown in FIGS. 4A and 4B. Basically, it is the same as the operation shown in FIGS. 2A and 2B, but the trigger of the start of the loosening operation is not the heater temperature detected by the air heater temperature detecting sensor 15, but the warm air temperature detected by the warm air temperature detecting sensor 12. Thereby, the accuracy of the temperature of the air blown against the uppermost one of the sheets 7, and the control or the like of the loosening time can be effected accurately, and it is possible to further improve the loosening performance of the whole.

The present invention is not restricted to the above-described embodiments, but various modifications one possible within the scope of the invention shown in the appended claims.

This application claims priority from Japanese Patent Application No. 2003-308783 filed on Sep. 1, 2003, which is hereby incorporated be reference herein.

What is claimed is:

1. A sheet feeding apparatus comprising:
   a stacking portion which stacks a plurality of sheets thereon;
   a sheet feeding portion which feeds the sheets stacked on said stacking portion;
   a fan which sends air to the sheets to loosen the sheets stacked on said stacking portion;
   a heater which warms the air sent by said fan;
   a temperature detecting portion which detects a temperature of said heater; and
   a control portion which starts temperature control for adjusting said heater to a target temperature, and thereafter starts an air sending operation of said fan in accordance with said temperature detecting portion having detected said target temperature.

2. A sheet feeding apparatus according to claim 1, wherein said control portion permits an operation of said sheet feeding portion after a predetermined time has elapsed after said temperature detecting portion has detected the target temperature.

3. A sheet feeding apparatus according to claim 1, further comprising a sheet information obtaining portion which obtains information regarding the sheets, wherein said control portion determines said target temperature on the basis of the information obtained by said sheet information obtaining portion.

4. A sheet feeding apparatus according to claim 3, wherein said sheet information obtaining portion obtains at least one of a kind, thickness, basis weight and size of the sheets.

5. A sheet feeding apparatus according to claim 1, further comprising an environmental information detecting portion which detects peripheral environmental information of said sheet feeding apparatus, wherein said control portion determines said target temperature on the basis of the environmental information detected by said environmental information detecting portion.

6. A sheet feeding apparatus according to claim 5, wherein said environmental information detecting portion detects temperature and humidity.

7. A sheet feeding apparatus according to claim 3, wherein said control portion controls so that the heater is not turned on when information indicating that the sheets are non-coat paper is obtained by said sheet information detecting portion.

8. A controlling method for controlling a sheet feeding apparatus having a stacking portion which stacks a plurality of sheets thereon, a sheet feeding portion which feeds the sheets stacked on said stacking portion, a fan which sends air to the sheets to loosen the sheets stacked on said stacking portion, and a heater which warms the air sent by said fan, said controlling method comprising:
   a temperature controlling step of starting temperature control for adjusting said heater to a target temperature;
   a temperature detecting step of detecting a temperature of the air sent by said fan; and
   a step of starting an air sending operation of said fan in accordance with a fact that the temperature of said air has reached said target temperature having been detected after said temperature control has been started.

* * * * *

UNITED STATES PATENT AND TRADEMARK OFFICE
CERTIFICATE OF CORRECTION

PATENT NO. : 7,249,759 B2  Page 1 of 1
APPLICATION NO. : 10/923741
DATED : July 31, 2007
INVENTOR(S) : Shunichi Komatsu et al.

It is certified that error appears in the above-identified patent and that said Letters Patent is hereby corrected as shown below:

COLUMN 3:
Line 2, "form" should read --from--.
Line 35, "present" should read --the present--.

COLUMN 4:
Line 4, "air as" should read --air has--.

COLUMN 5:
Line 27, "one" should read --are--.

COLUMN 6:
Line 41, "the air sent by said fan; and" should read --said heater; and--.
Line 43, "air" should read --heater--.

Signed and Sealed this

First Day of April, 2008

JON W. DUDAS
*Director of the United States Patent and Trademark Office*